US009458930B2

(12) United States Patent
Inagawa et al.

(10) Patent No.: US 9,458,930 B2
(45) Date of Patent: Oct. 4, 2016

(54) SHIFT CONTROL DEVICE FOR AUTOMATIC TRANSMISSION

(71) Applicant: HONDA MOTOR CO., LTD., Tokyo (JP)

(72) Inventors: Yasushi Inagawa, Wako (JP); Yoshiharu Saito, Offenbach/am Main (DE); Christoph Karger, Offenbach/am Main (DE)

(73) Assignee: HONDA MOTOR CO., LTD., Tokyo (JP)

( * ) Notice: Subject to any disclaimer, the term of this patent is extended or adjusted under 35 U.S.C. 154(b) by 59 days.

(21) Appl. No.: 14/406,353

(22) PCT Filed: Apr. 12, 2013

(86) PCT No.: PCT/JP2013/061056
§ 371 (c)(1),
(2) Date: Dec. 8, 2014

(87) PCT Pub. No.: WO2013/183362
PCT Pub. Date: Dec. 12, 2013

(65) Prior Publication Data
US 2015/0184742 A1    Jul. 2, 2015

(30) Foreign Application Priority Data

Jun. 7, 2012 (JP) .................................. 2012-130298

(51) Int. Cl.
*F16H 61/02* (2006.01)
*F16H 61/10* (2006.01)
(Continued)

(52) U.S. Cl.
CPC .......... *F16H 61/10* (2013.01); *F16H 61/0213* (2013.01); *F16H 59/24* (2013.01);
(Continued)

(58) Field of Classification Search
None
See application file for complete search history.

(56) References Cited

U.S. PATENT DOCUMENTS 5,483,446 A * 1/1996 Momose ............... B62D 6/007
701/1
6,070,118 A * 5/2000 Ohta ................. B60K 31/0066
477/97

(Continued)

FOREIGN PATENT DOCUMENTS

JP         10-325462 A      12/1998
JP         2003-139238 A     5/2003

(Continued)

OTHER PUBLICATIONS

International Search Report dated May 14, 2013 corresponding to International Patent Application No. PCT/JP2013/061056 and English translation thereof.

(Continued)

*Primary Examiner* — Justin Holmes
(74) *Attorney, Agent, or Firm* — Squire Patton Boggs (US) LLP

(57) ABSTRACT

Adding a driver's intention and running environments to conditions for cancelling a delay of an upshift after kick-down enables the upshift at a suitable timing depending on a vehicle's running environments and aspects of the driver's operation. A shift control device for automatic transmission calculates an allowance driving force of the vehicle when upshifting at a current vehicle speed and throttle opening, and also calculates a threshold value of a driving force depending on an average value of throttle opening variation, an average value of vehicle speed variation, a cornering judgment of a winding degree of a road on which the vehicle is running and a gradient judgment of a gradient of a road surface on which the vehicle is running. Then, after comparing the threshold value and the allowance driving force, the device permits an upshift when the allowance driving force is larger than the threshold value.

4 Claims, 6 Drawing Sheets

(51) Int. Cl.
*F16H 59/24* (2006.01)
*F16H 61/00* (2006.01)
*F16H 59/14* (2006.01)
*F16H 59/66* (2006.01)

(52) U.S. Cl.
CPC ... *F16H2059/142* (2013.01); *F16H 2059/148* (2013.01); *F16H 2059/663* (2013.01); *F16H 2061/0096* (2013.01)

(56) References Cited

U.S. PATENT DOCUMENTS

| | | | | |
|---|---|---|---|---|
| 6,085,137 | A | * | 7/2000 | Aruga ............... F16H 59/66 477/120 |
| 6,220,986 | B1 | * | 4/2001 | Aruga ............... F16H 61/0213 477/97 |
| 7,530,923 | B2 | | 5/2009 | Saito et al. |
| 2008/0182714 | A1 | * | 7/2008 | Saitou ............... F16H 61/143 477/64 |
| 2010/0191428 | A1 | * | 7/2010 | Tamura ............ F16H 61/66259 701/58 |

FOREIGN PATENT DOCUMENTS

| | | |
|---|---|---|
| JP | 2005-076800 A | 3/2005 |
| JP | 2007-120703 A | 5/2007 |

OTHER PUBLICATIONS

Canadian Office Action and Examination Search Report application No. 2,874,520 issued Dec. 10, 2015.
Japanese Office Action Notice of Reasons for Rejection application No. P2014-519869 mailed Sep. 8, 2015.

* cited by examiner

SHIFT CONTROL DEVICE FOR AUTOMATIC TRANSMISSION

TECHNICAL FIELD

The present invention relates to a shift control device for automatic transmission mounted on a vehicle, especially to a shift control device which can prevent shift hunting by appropriately setting conditions for re-upshift after downshift.

BACKGROUND ART

Various kinds of shift control devices are known. They perform upshift and downshift controls of gear positions of an automatic transmission, on the basis of vehicle speeds and engine loads (throttle opening or accelerator opening) as parameters, according to upshift and downshift lines which set upshift and downshift transmission patterns per gear position. Such shift control devices, for example one described in Patent Document 1, conventionally prevent shift hunting (shift-busy state) that a vehicle re-downshifts or re-upshifts immediately after upshift or downshift.

The above-described shift control devices are adapted to, when a kickdown occurs, shift an upshift line on a shift map to a low throttle opening (a low accelerator opening) and high vehicle speed side, expanding a hysteresis range for upshift and downshift. In this hysteresis range, an allowance driving force which could occur at a shift position after upshift is constantly calculated. And only when this allowance driving force exceeds a predetermined value, the devices are adapted to permit an upshift, or in other words, cancel a shift hold. Also, when the allowance driving force falls on a lower throttle opening (a lower accelerator opening) and higher vehicle speed side than the above-mentioned shifted upshift line, an upshift is permitted, in case of a re-stepping of an accelerator pedal, after a delay time which is a predetermined constant time or a time set based on a variation of vehicle speed and throttle opening passes.

RELATED ART DOCUMENTS

Patent Documents

Patent Document 1: Japanese Patent Laid-Open Publication No. 2003-139238

DISCLOSURE OF THE INVENTION

Problems to be Solved by the Invention

However, in the conventional control using the above-described shift control devices, a threshold value of allowance driving force after upshift, which is a condition for cancelling a shift hold in a hysteresis range, is a value depending on a vehicle speed, but not a value including a vehicle driver's intention, running environments, etc. Due to this, according to running environments, aspects of the driver's operation, etc., the shift control might entail uncomfortable feelings for the driver such as feelings of driving force shortage, excessive deceleration, etc.

In addition, a delay time allowing an upshift when a throttle opening falls on a lower throttle opening side and a vehicle speed falls on a higher vehicle-speed side than an above-mentioned shifted upshift line is a predetermined constant time period or a time based on a variation of vehicle speed and throttle opening. Such delay time cannot be a time including a vehicle driver's intention and vehicle's running environments, whereby if delaying an upshift on the basis of the delay time, the shift control might entail uncomfortable feelings according to the vehicle's running environments and aspects of the driver's operation.

In view of the above-described problem, the present invention has an object to provide a shift control device for automatic transmission which, in a control of delaying an upshift after downshift (a shift hold control), enables an upshift at an appropriate timing depending on aspects of a driver's operation and vehicle's running environments by adding driver's intentions and running environments to conditions for cancelling an upshift delay, allowing a shift hold control without giving the driver uncomfortable feelings.

Means of Solving the Problems

The present invention for solving the above-mentioned problem is a shift control device for automatic transmission for upshift and downshift controls of gear positions according to a shift map including an upshift line (UP) and a downshift line (DN) set per gear position. The shift control device includes: a speed control means (5) for outputting upshift and downshift transmission signals according to a first upshift line (UP1) and the downshift line (DN) based on first transmission properties set depending on a vehicle speed (V) and a throttle opening (TH); a downshift judgment means (5) for judging, on the basis of the first transmission properties, that the downshift transmission signals have been output; a transmission property change means (5) for, when the downshift judgment means judges downshift, changing the first transmission properties to second transmission properties including a second upshift line (UP2) which is the first upshift line (UP1) shifted to a high vehicle speed side; an operational state detection means (5, 201-203) for detecting an operational state of a vehicle; and an upshift permission means (5) for permitting an upshift according to fulfillment of predetermined conditions when the vehicle speed (V) and the throttle opening (TH) are in a range (B) between the first upshift line (UP1) and the second upshift line (UP2). The upshift permission means (5) is characterized by calculating an allowance driving force (F1) of the vehicle when upshifting at a current vehicle speed (V) and throttle opening (TH), then calculating a threshold value (Fth) of driving force including a variation of throttle opening (TH), a variation of vehicle speed (V), a cornering judgment of judging a winding degree of a road on which the vehicle is running, and a gradient judgment of judging a gradient of a road surface on which the vehicle is running, then comparing the threshold value (Fth) with the allowance driving force (F1), and accordingly permitting an upshift when the allowance driving force (F1) is larger than the threshold value (Fth).

In the shift control device for automatic transmission of the present invention, when a vehicle speed and a throttle opening are in a range between the first upshift line and the second upshift line, an allowance driving force of a vehicle when upshifting at a current vehicle speed and throttle opening is compared with a threshold value of driving force depending on a variation of throttle opening, a variation of vehicle speed, a cornering judgment and a gradient judgment, and then an upshift is permitted (a shift hold is cancelled) if the allowance driving force is larger than the threshold value. For such process, a value including a vehicle driver's intention or running environments of the vehicle is used as a threshold value of the allowance driving force after upshift which is a condition for cancelling the shift hold. Thus, regardless of vehicle's running environments and aspects of the driver's operation, an upshift after downshift can be permitted at a most suitable timing. Therefore, a shift control can be realized without giving the driver uncomfortable feelings such as feelings of driving force shortage, excessive deceleration, etc.

In addition, in the above-described shift control device, the threshold value (Fth) of driving force should be set higher as a winding degree in a cornering judgment is higher, and so should be as a gradient of a road surface in a gradient judgment is higher. According to this, higher the winding degree of a road on which a vehicle is running is, larger an allowance driving force permitting an upshift is, and higher a degree of a gradient road on which the vehicle is running is, larger an allowance driving force permitting an upshift is, thereby allowing to delay a timing of the upshift. Therefore, in an upshift control when the vehicle runs on the winding or gradient road, the shift control device can effectively prevent to give a driver a feeling of driving force shortage.

Further, the present invention for solving the above-mentioned problem is a shift control device for automatic transmission which performs upshift and downshift controls of gear positions according to a shift map including an upshift line (UP) and a downshift line (DN) set per gear position. The shift control device includes: a speed control means (5) which outputs transmission signals of upshift and downshift according to the first upshift line (UP1) and the downshift line (DN) based on first transmission properties set depending on a vehicle speed (V) and a throttle opening (TH); a downshift judgment means (5) which judges, based on the first transmission properties, that a transmission signal of downshift has been output; a transmission property change means (5) for, when the downshift judgment means (5) judges a downshift, changing the first transmission properties to second transmission properties including a second upshift line (UP2) which is the first upshift line (UP1) shifted to a high vehicle speed side; an operational state detection means (5, 201-203) for detecting a vehicle's operational states; and a delay means (5) which, in a range (C) where an upshift transmission signal should be output based on the second transmission properties, delays to output a transmission signal of upshift during a predetermined delay time (T) based on a vehicle's operational state detected by the operational state detection means (5, 201-203). The delay means (5) is characterized by calculating a first time (T1) based on a variation of vehicle speed (V), a variation of throttle opening (TH) and a vehicle speed (V) and a second time (T2) based on at least either one of a cornering judgment of a degree of a winding road on which the vehicle is running or a gradient judgment of a gradient of a road on which the vehicle is running, and then setting a combined time (T) of the first time (T1) and the second time (T2) as a delay time (T) for delaying an upshift.

The shift control device for automatic transmission according to the present invention calculates a first time based on a variation of vehicle speed, a variation of throttle opening and a vehicle speed and a second time based on at least either one of a cornering judgment or a gradient judgment, and then sets a combined time of the first time and the second time as a delay time for delaying an upshift. For such process, a time including a vehicle driver's intention or running environments is used as the delay time for permitting the upshift. Thus, regardless of the vehicle's running environments and aspects of the driver's operations, the upshift after downshift can be permitted at a most suitable timing. Therefore, a shift control can be realized without giving the driver uncomfortable feelings such as feelings of driving force shortage, an excessive deceleration, etc.

In addition, in the above-mentioned shift control device, the first time (T1) should be shorter as the variation of vehicle speed (V) is smaller and the variation of throttle opening (TH) is smaller, and be shorter as the vehicle speed (V) is higher. And, the second time (T2) should be longer as a winding degree of a road in the cornering judgment is higher and be longer as a gradient of a road surface in the gradient judgment is higher. According to this, when it can be presumed that the driver has less intention of acceleration and deceleration and running environments are relatively stable with a low winding degree and gradient, an upshift timing can be advanced by setting a delay time for delaying an upshift short. On the other hand, when the vehicle is running on a winding or gradient road, an upshift timing can be delayed by setting a delay time for delaying an upshift long, preventing to give the driver a feeling of driving force shortage. The reference numerals and symbols in the above parentheses represent the reference numerals and symbols used for structural elements in an embodiment which will be described later, as an example of the present invention.

Effects of the Invention

The shift control device for automatic transmission in accordance with the present invention enables, in a control of delaying an upshift after downshift (a shift hold control), an upshift at an appropriate timing depending on aspects of a driver's operation and vehicle's running environments by adding the driver's intentions and running environments to conditions for cancelling upshift delay, allowing a shift hold control without giving the driver uncomfortable feelings.

MODE FOR CARRYING OUT THE INVENTION

Figure 1:
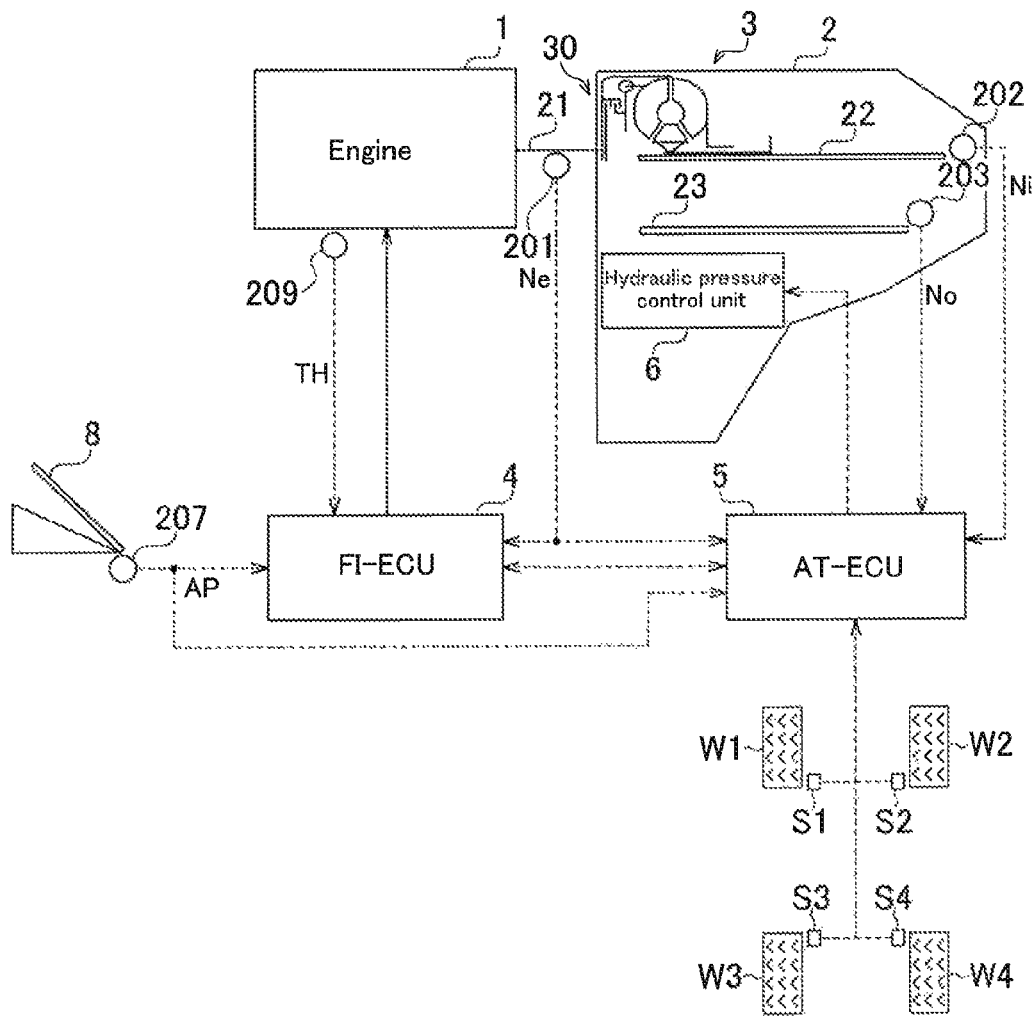
FIG. 1 is a schematic view of a configuration example of a vehicle provided with a shift control device for an automatic transmission of one embodiment of the present invention.

Hereinafter, an embodiment of the present invention will be described in detail with reference to the appending drawings. FIG. 1 is a schematic view of a configuration example of a vehicle provided with a shift control device for automatic transmission of one embodiment of the present invention. The vehicle of the present embodiment includes: an engine 1; an automatic transmission 2 connected with the engine 1 via a fluid-type torque converter 3; an FI-ECU (a fuel injection engine control device) 4 for electronically controlling the engine 1; an AT-ECU (an automatic transmission engine control device) 5 for electronically controlling the automatic transmission 2 including the torque converter 3; and a hydraulic control device 6 which, according to a control using the AT-ECU 5, performs oil pressure controls of rotary drive and lock up control of the torque converter 3 and connection (engagement) and release of a plurality of frictional engagement elements provided by the automatic transmission 2.

A rotary output of the engine 1 is output to a crankshaft 21 (an output shaft of the engine 1) and transmitted to a main shaft 22 of the automatic transmission 2 via the torque converter 3. The torque converter 3 is provided with a lock-up clutch 30. The lock-up clutch 30 is set at either lock up ON or OFF according to a lock up control using the AT-ECU 5.

In a neighborhood of the crankshaft 21, a crankshaft rotating speed sensor 201 for detecting rotating speed Ne of the crankshaft 21 (the engine 1). In a neighborhood of the main shaft 22, a main shaft rotating speed sensor 202 for detecting a rotating speed Ni of the main shaft 22 (an input shaft rotating speed of the automatic transmission 2). In a neighborhood of a counter shaft 23, a counter shaft rotating speed sensor 203 for detecting a rotating speed No of the counter shaft 23 (an output shaft rotating speed of the automatic transmission 2). Vehicle speed data V calculated by the rotating speed data Ne, Ni, No and No detected by each sensor 201-203 is given to the AT-ECUS. Also, the engine rotation speed data Ne is given to the FI-ECU (the fuel injection engine control device) 4. Further, a vehicle is provided with wheel rotation speed sensors S1-S4 for detecting a wheel rotation speed of each of front, rear, left and right wheels W1-W4. Detection values from the wheel rotation speed sensors S1-S4 (wheel rotation speed pulses) are input to the AT-ECU 5. Note that the AT-ECU 5 functions as a speed control means, a downshift judgment means, a transmission property change means, an operational state detection means, an upshift permission means, a delay means, etc. in accordance with the present invention.

Figure 2:
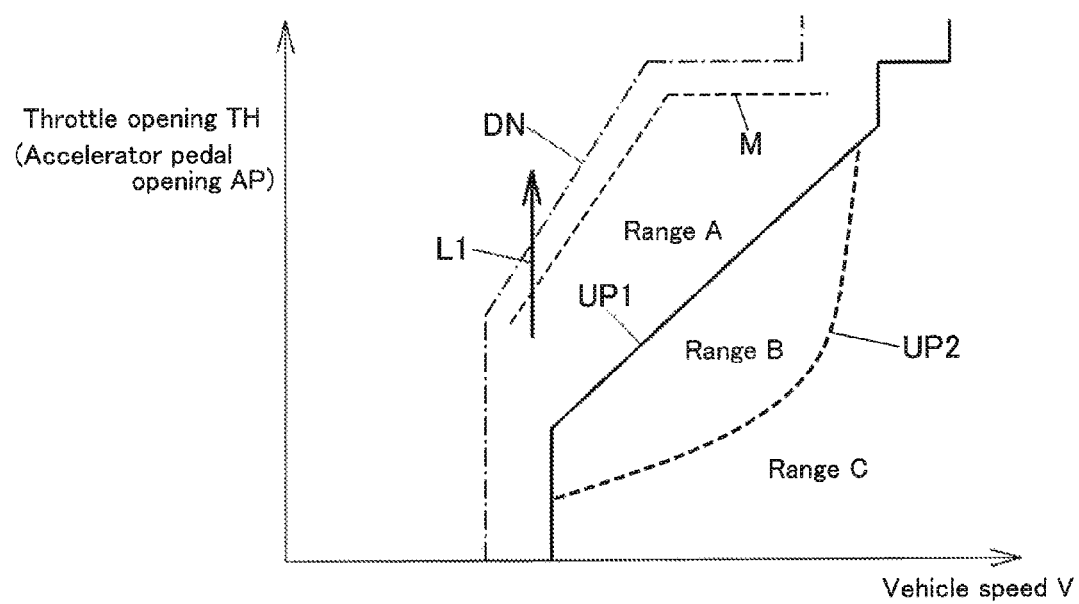
FIG. 2 is a view showing one example of a shift map of the automatic transmission.

FIG. 2 is a view showing one example of a shift map (a transmission property map) of the automatic transmission 2. In the graph of the figure, the vertical and horizontal axes stand respectively for vehicle speed V and throttle opening TH (or accelerator opening AP). Note that when throttle opening TH is referred to in the following description, "accelerator opening AP" may be used instead of "throttle opening TH" unless otherwise specifically noted. A line DN drawn in an alternate long and short dash line on the graph of the figure is a downshift line, and a line UP1 drawn in a continuous line is an upshift line (a first upshift line). As is known in the art, such downshift line DN and upshift line UP1 are each set appropriately per gear position. Still, for a simplified description, only one set of gear positions (i.e., a pair of an upshift from nth to (n+1)th gears and a downshift from (n+1)th to nth gears) will be illustrated and described as follows. In this embodiment, as shown in the figure, the upshift line UP1 is set at low vehicle speed, or nearer to the downshift line DN, attempting to improve fuel consumption by advancing an upshift. On the contrary, a shift hunting (a shift-busy state) causing a re-downshift or re-upshift frequently occurs respectively after upshift or downshift especially in a low vehicle speed range, against which a suitable preventive measure is taken as will be described later. Note that such shift map including the upshift line UP1 and the downshift line DN per gear position is prestored in the AT-ECU (automatic transmission engine control device) 5.

The AT-ECU (automatic transmission engine control device) 5 performs, as one generally known, a downshift control, taking a current vehicle speed V and accelerator opening AP as parameters, when an intersection point position between the vehicle speed V and the accelerator opening AP on the shift map steps over the downshift line DN from a higher gear position (n+1) on the right-hand (or bottom) side to a lower gear position (n) on the left-hand (or upper) side in the figure. On the other hand, the AT-ECU performs an upshift control when an intersection point position between the vehicle speed V and the accelerator opening AP on the shift map steps over the upshift line UP1 (UP2) from a lower gear position (n) on the left-hand (or upper) side to a lower gear position (n+1) side on the right-hand (or bottom) side.

In the graph of FIG. 2, the first upshift line UP1 (continuous line) before shifting and the second upshift line UP2 (dotted line) after shifting are set as upshift lines. A range A between the downshift line DN and the first upshift line UP1 is an upshift non-permission range where no upshift is performed after downshift. A range B between the first upshift line UP1 and the second upshift line UP2 is a hysteresis range where an upshifting is permitted only when predetermined conditions are fulfilled after downshift. And, a range C on a higher vehicle speed and lower throttle opening side than the second upshift line UP2 is an upshift permission range where an upshift is permitted after a delay time T to be mentioned later passes.

Next, a speed control (an upshift delay control) using the shift control device of the present embodiment will be described. A control according to the present embodiment is to delay outputting an upshift signal after expanding an nth gear range when performing a kickdown (a downshift) operation from (n+1)th to nth (or (n−1)th) gear positions. First, before performing the above-motioned control according to the present embodiment, the nth gear range is expanded by shifting the upshift line after the kickdown. In this shifting of the upshift line, throttle opening TH data from a throttle opening sensor 209 and vehicle speed V data is input to the AT-ECU 5. The AT-ECU 5 refers to the shift map of FIG. 2 on the basis of this vehicle speed V and throttle opening TH data.

Now, the vehicle speed V and the throttle opening TH are supposed to be at a point X in the range A of FIG. 2. In this state, by a driver's kickdown operation, the throttle opening TH is supposed to increase across the downshift line DN from (n+1)th to nth gear as shown by arrow L1 of FIG. 2. Note that the downshift here may be one from (n+1)th to (n−1)th gear, which is not shown in the figure. In this case, a control is performed in the way that the upshift line from nth to (n+1)th gear is changed (shifted) from the first upshift line UP1 to the second upshift line UP2. Thus, a range where nth gear is maintained after the downshift from (n+1)th to nth gear is expanded.

Figure 3:
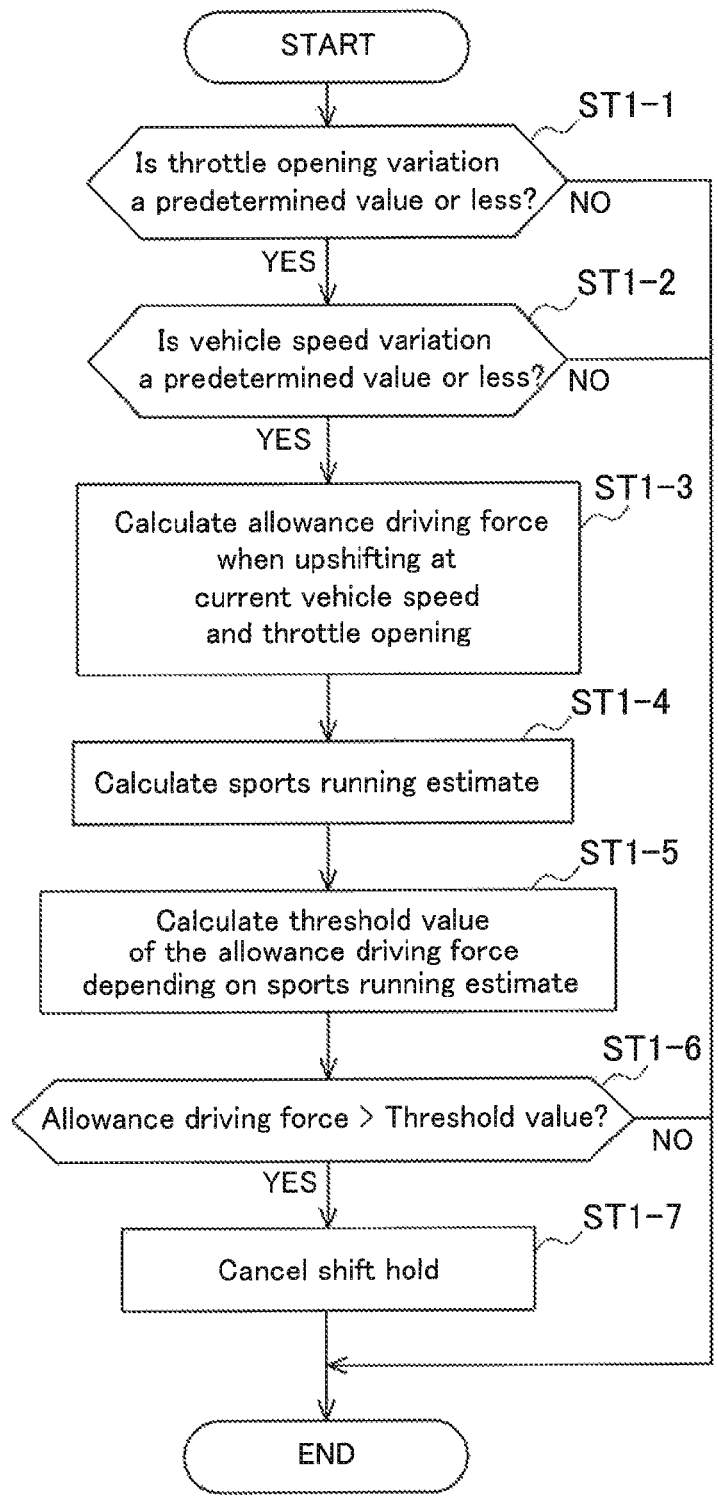
FIG. 3 is a flow chart showing a process of upshift judgment when a vehicle speed and a throttle opening fall in range B on the shift map.

FIG. 3 is a flow chart showing a process of an upshift judgment when a vehicle speed and a throttle opening fall in the range B on the shift map in the case that the upshift line is, according to the above-described process, shifted after kickdown.

In the flow chart of the figure, it is first judged whether an average value of throttle opening TH variation is a predetermined value or less (Step ST1-1). As a result, unless the average value of throttle opening TH variation is the predetermined value or less (NO), the operation is terminated without proceeding to a next process. On the other hand, if the average value of throttle opening TH variation is the predetermined value or less (YES), it is successively judged whether an average value of vehicle speed V variation is a predetermined value or less (Step ST1-2). As a result, unless the average value of vehicle speed V variation is the predetermined value or less (NO), the operation is terminated without proceeding to a next process. On the other hand, if the average value of vehicle speed V variation is the predetermined value or less (YES), an estimated acceleration (hereinafter referred to as "allowance driving force") F1 in the case of an upshift from nth to (n+1)th gear at the current vehicle speed V and throttle opening TH is calculated (Step ST1-3). The allowance driving force F1 here is an estimated acceleration based on the vehicle speed V and the throttle opening TH on a line M in the graph of FIG. 2. Note that the shift control device of the present embodiment is adapted, if a vehicle speed V and a throttle opening TH after downshift (kickdown) fall in the range B, to constantly calculate the allowance driving force on the basis of the vehicle speed V and the throttle opening TH on the above-mentioned line M.

Next, sports running estimate SP is calculated (Step ST1-4). The sports running estimate SP here refers to an average value (or an integrated value; the same is applied to the following description) of throttle opening TH variation (a temporal variation), an average value (or an integrated value; the same is applied to the following description) of vehicle speed V variation (a temporal variation), a value calculated on the basis of a cornering judgment of judging a winding degree of a road on which a vehicle is running and a gradient judgment of judging a gradient of a road surface on which the vehicle is running.

A process for calculating a lateral acceleration of a vehicle in the above-mentioned cornering judgment will be described. When calculating the lateral acceleration, each wheel rotation speed of front, rear, left and right wheels W1-W4 detected by each wheel rotation speed sensor S1-S4 is input to the AT-ECU 5. In the AT-ECU 5, the wheel rotation speeds of the front, rear, left and right wheels are calculated on the basis of each of the input wheel rotation speeds. Subsequently, a differential diameter rate between the right and left rear wheels W3, W4 will be learned. The learning of differential diameter rate here refers to, in order to detect a relative dispersion between tire diameters of the right and left rear wheels W3, W4, calculating a tire differential diameter rate, which is a rate between the tire diameters of the left and right rear wheels W3, W4, and then calculating a differential diameter rate learning value by learning the calculated tire differential diameter rates.

Next, using the calculated learning value of different diameter rate, a lateral acceleration estimate is calculated. First, each rotation speed of the right and left rear wheels W3, W4 output by each of the wheel rotation speed sensors S3, S4 is multiplied by each radius of the wheels W3, W4 to calculate a wheel speed. Then, from these rear wheel rotation speeds, a lateral acceleration estimate is calculated. Note that except a cornering judgment on the basis of a lateral acceleration estimate calculated by the above-described process, if a vehicle is equipped with a sensor which can detect a lateral acceleration of the vehicle, a cornering judgment may be performed on the basis of a value detected by such sensor. Also, a cornering judgment may be performed on the basis of a lateral acceleration calculated by another technique than the above one.

Next, a process for calculating a gradient estimate of a road surface in the above-mentioned gradient judgment will be described. For calculating a gradient estimate, first, an expected acceleration which is expected to be output by a vehicle is calculated based on a vehicle speed V and an engine load (a throttle opening TH). Then, a real acceleration or deceleration is evaluated from an increase or decrease rate of the vehicle speed V per unit time, and the real acceleration is compared with the calculated expected acceleration. When the real and expected accelerations substantially correspond with each other, the vehicle is judged to be running on a flat road. When the real acceleration exceeds the expected acceleration, the vehicle is judged to be running on a descending road. And when the real acceleration is below the expected acceleration, the vehicle is judged to be running on a hill-climbing road. By judging a descending or hill-climbing road on the basis of such comparison between a real acceleration and an expected acceleration, a gradient estimate is calculated. Note that except a gradient judgment performed based on a gradient estimate calculated by the above-mentioned process, if a vehicle is equipped with a sensor which can detect slope degrees of a road surface on which the vehicle is running, a gradient judgment may be performed based on the value detected by this sensor. Also, it may be based on a gradient estimate calculated by any method other than the above-described one.

A sports running estimate SP is higher as an average value of throttle opening TH variation is higher, and so is as an average value of vehicle speed V variation is higher. Also, a sports running estimate SP is set higher as a lateral acceleration value of a vehicle in the above-described cornering judgment is higher, or in other words, as a winding degree (a curvature degree) of a road on which a vehicle is running, and so is as a gradient (a slope degree) of a road surface in the above-mentioned gradient judgment is higher.

Back to the flow chart of FIG. 3 after calculating the sports running estimate SP by the above-described method, a threshold value Fth of allowance driving force F1 for permitting an upshift in the range B is set on the basis of the above sports running estimate SP (step ST1-5). Therefore, the threshold value Fth of driving force here will be a value in accordance with an average value of throttle opening TH variation, an average value of vehicle speed V variation, a winding degree in a cornering judgment and a gradient in a gradient judgment.

Next, the threshold value Fth is compare with the above-described allowance driving force F1 (Step ST1-6). As a result, if the allowance driving force F1 is higher than the threshold value Fth (F1>Fth)(YES), an upshift is permitted (a shift hold is cancelled) (Step ST1-7). On the other hand, if the allowance driving force F1 is the threshold value Fth or less (F1≤fth)(NO), the operation is cancelled without permitting an upshift.

Figure 4:
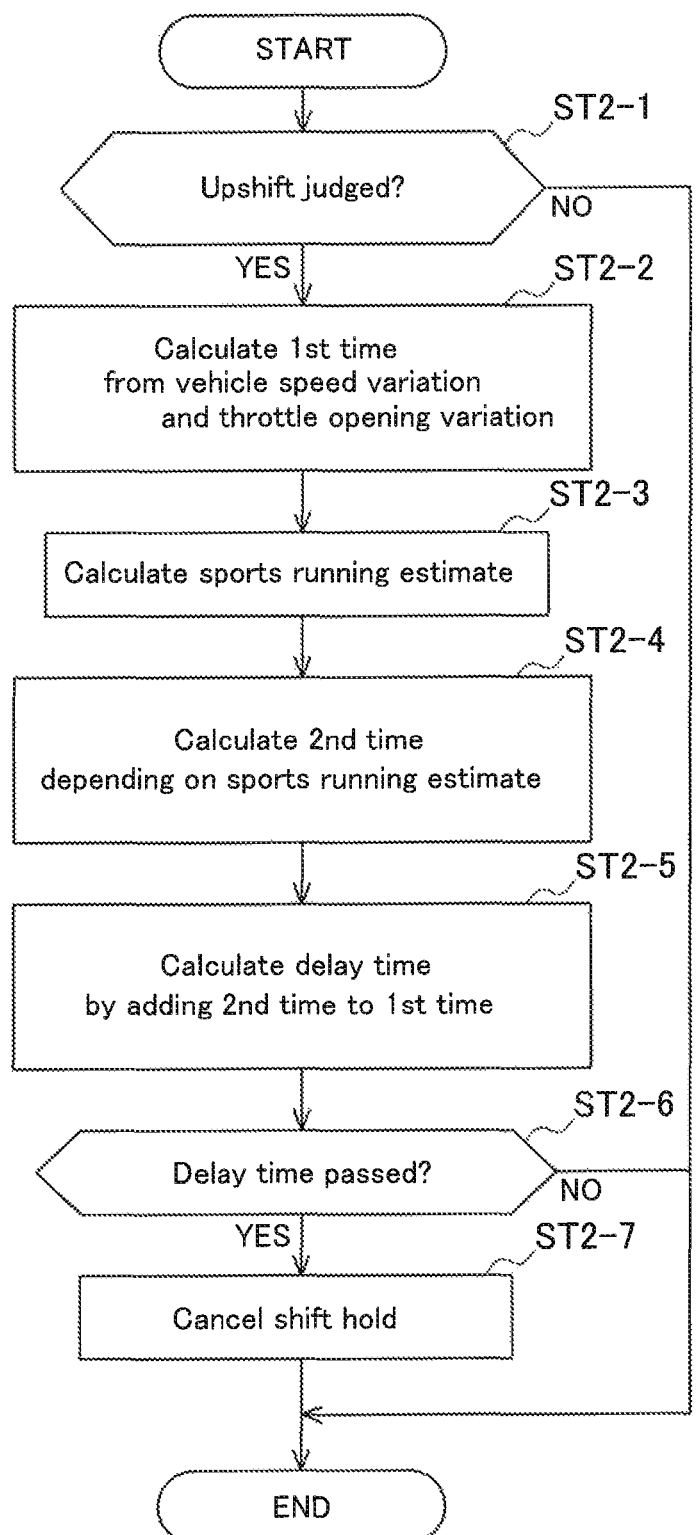
FIG. 4 is a flow chart showing a process of upshift judgment when a vehicle speed and a throttle opening fall in range C on the shift map.

FIG. 4 is a flow chart showing a process of an upshift judgment when a vehicle speed V and a throttle opening TH fall in the range C on the shift map. In a control of the present embodiment, even if an upshift judgment is made in the AT-ECU 5 when the vehicle speed V and the throttle opening TH are in the range C, an upshift is permitted not immediately but after a predetermined delay time passes. Namely, in the flow chart of FIG. 4, it is first judged whether there has been an upshift judgment or not in the AT-ECU 5 (Step ST2-1). As a result, if there has been no upshift judgment (NO), the operation is terminated without proceeding to a next process. On the other hand, if there has been an upshift judgment (YES), a first time T1 is calculated from an average value of vehicle speed V variation and an average value of throttle opening TH variation (Step ST2-2).

Figure 5:
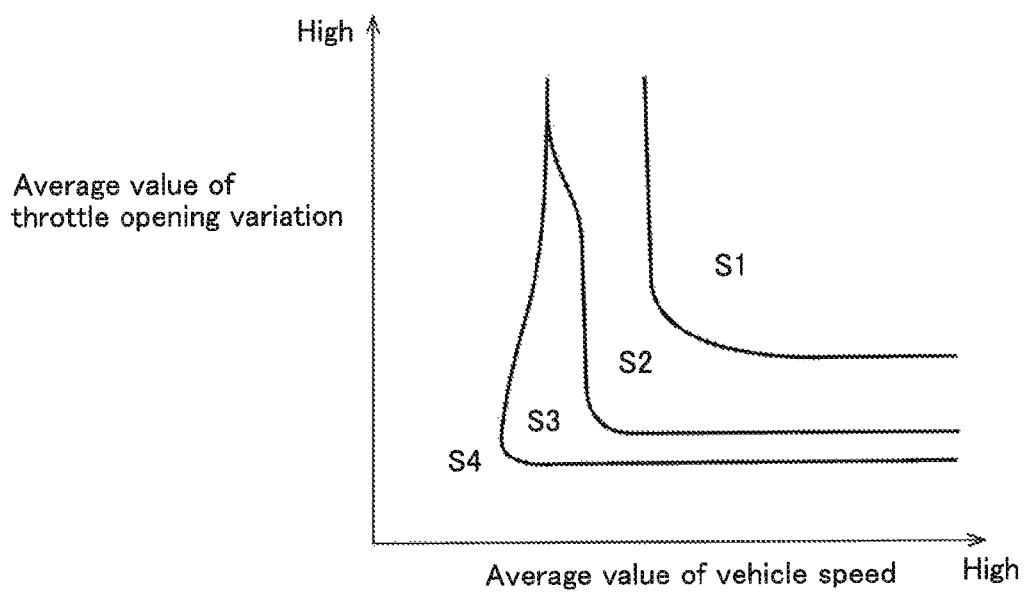
FIG. 5 is a graph illustrating correlations between average variation values of vehicle speed and throttle opening and a first time (a delay time)

FIG. 5 is a graph illustrating correlations between average values of vehicle speed V and throttle opening TH and the above-described first time T1 (a delay time). In the graph of the figure, the horizontal and vertical axes stand respectively for average values of variations of vehicle speed V and throttle opening TH. Ranges S1-S4 in the graph are set so that the first time T1 is shorter as shifting from S1 to S4, and longer as shifting from S4 to S1. Road environments and a driver's desired intentions are assumed from test runs in various road environments. The correlations shown in this graph use average values of variations of vehicle speed V and throttle opening TH which reflect such road environments and the driver's desired intentions. These ranges can be arbitrarily preset most suitably.

Back to the flow chart of FIG. 4, the above-described sports running estimate SP (Step ST2-3) is calculated, and a second time T2 depending thereon is calculated (Step ST2-4). And, a combined time of the first time T1 and the second time T2 is set as a delay time T (=T1+T2) (Step ST2-5). In this way, by adding the second time T2 depending on the sports running estimate SP as a correction value depending on a sports running condition to the above-described first time T1, a delay time T for permitting an upshift is adapted to be calculated.

The above-described first time T1 is set shorter as an average value of vehicle speed V variation is smaller, so is as an average value of throttle opening TH variation is smaller, and so is as a vehicle speed V is higher. In other words, when it is estimated that a driver has not much intention of acceleration or deceleration and running environments are somewhat stable (neither a highly winding nor much hill-climbing road), the delay time T is set short by shortening the first time. And, the above-mentioned second time T2 is set longer as a lateral acceleration (a winding degree) of the vehicle in the above-mentioned cornering judgment is higher, and so is as a gradient of a road surface in a gradient judgment is higher. Thus, as the second time T2 becomes longer, the delay time T is set longer.

Thereafter, it is judged whether the delay time T has passed or not (Step ST2-6). As a result, if the delay time T has not passed (NO), the operation is terminated without proceeding to a next process, and if the delay time T has passed (YES), an upshift is permitted (a shift hold is cancelled) (Step ST2-7). Thus, a transmission signal of the upshift from nth to (n+1)th gear is output, and then the automatic transmission 2 is shifted from nth to (n+1)th gear.

Figure 6:
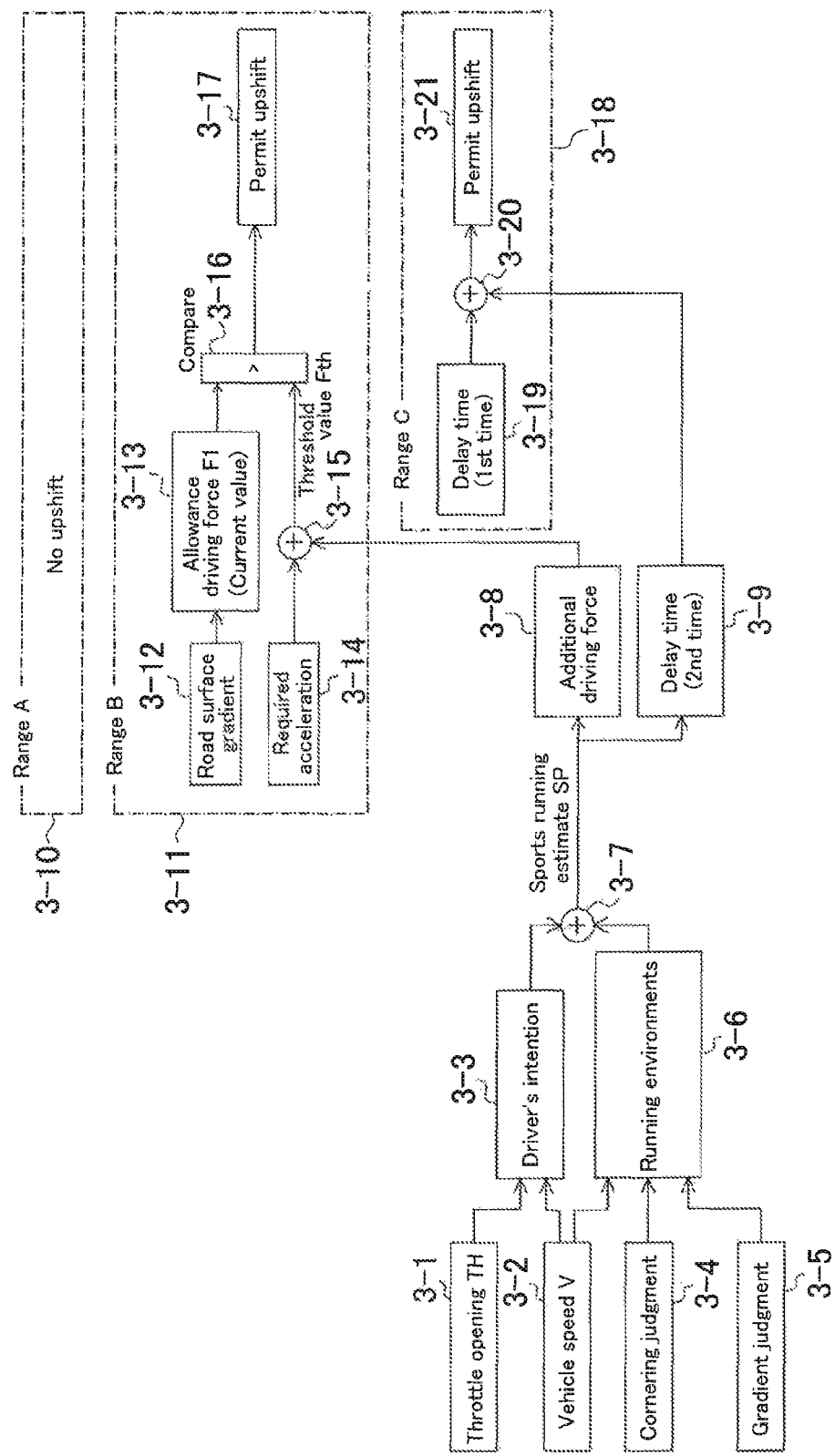
FIG. 6 is a block diagram illustrating a processing of an upshift after downshift (a kickdown) using the shift control device of the present embodiment.

FIG. 6 is a block diagram illustrating an upshift processing after kickdown (downshift) using the shift control device of the present embodiment. Note that the processing shown therein is a schematically arranged processing of the upshift after kickdown described using the flow charts of FIGS. 3 and 4. As shown in the figure, in a transmission control using the shift control device of the present embodiment, a sports running estimate SP which is a value including a driver's intention is calculated (3-3), as an upshift processing after downshift (kickdown), on the basis of an average value of throttle opening TH (3-1) and an average value of vehicle speed V (3-2). Also, a sports running estimate SP which is a value including a vehicle's running environments is calculated (3-6) on the basis of a cornering judgment (3-4) and a gradient judgment (3-5). And, after combining these sports running estimates SP (3-7), an additional driving force of the vehicle (3-8) is calculated and a second time T2 which is an additional delay time is calculated (3-9).

When a vehicle speed V and a throttle opening TH is in the range A, an upshift from nth gear is not permitted (3-10). Instead, when the vehicle speed V and the throttle opening TH is in the range B (3-11), a current allowance driving force (an allowance driving force based on the vehicle speed V and the throttle opening TH on the line M) F1 is calculated from a gradient of a road surface (3-12) on which the vehicle is running (3-13). In addition, a required acceleration depending on the current vehicle speed V (3-14) is calculated, and then the additional driving force calculated in the former process in addition to this required acceleration is set as a threshold value Fth of the allowance driving force for upshift permission (3-15). Then, after comparing the threshold value Fth with the above-mentioned allowance driving force F1 (3-16), if the allowance driving force F1 is larger than the threshold value Fth, an upshift is permitted (3-17).

When a vehicle speed V and a throttle opening TH are in the range C (3-18), the processing proceeds in the following way: as a delay time for permitting an upshift, a first time T1 is calculated on the basis of an average value of vehicle speed V variation, an average value of throttle opening TH variation and a vehicle speed V (3-19); a second time T2 calculated in the above-described process is added to this first time T1 (3-20); a combined time of the first time T1 and the second time T2 is set as a delay time T; and if the delay time T passes, an upshift is permitted (3-21).

As described above, the shift control device of the present embodiment is adapted to, when a vehicle speed V and a throttle opening TH are in the range B (hysteresis range) between a first upshift line UP1 and a second upshift line UP2, compare an allowance driving force F1 when upshifting at the current vehicle speed V and throttle opening TH with a threshold value Fth of a driving force depending on an average value of throttle opening TH variation, an average value of vehicle speed V variation, a cornering judgment judging a winding degree of a road on which a vehicle is running, a gradient judgment judging a gradient of a road surface on which the vehicle running, and then if the allowance driving force F1 is larger than the threshold value Fth, permit an upshift. For such process, as a threshold value Fth of an allowance driving force F1 which is a condition for cancelling a shift hold after upshift, a value including a driver's intention or running environments is used. Due to this, regardless of the vehicle's running environments and aspects of the driver's operation, an upshift after downshift can be permitted at a most suitable timing. Therefore, a shift control can be realized without giving the driver any uncomfortable feelings such as feelings of driving force shortage, excessive deceleration, etc.

Further, the above-described threshold value Fth of the allowance driving force F1 is set higher as the winding degree in the cornering judgment is higher, and so is as the road surface gradient in the gradient judgment is higher. According to this, the allowance driving force F1 permitting an upshift is larger as the winding degree of the road on which the vehicle is running is higher, and so is as the gradient of the road on which the vehicle is running is higher, thereby enabling to delay the upshift. Therefore, in the shift control when running on the winding and gradient road, the shift control device can effectively prevent to give the driver the sense of driving force shortage.

Further, the shift control device of the present embodiment is adapted to calculate the first time T1 on the basis of the average value of vehicle speed V variation, the average value of throttle opening TH variation and the vehicle speed V, and the second time T2 on the basis of at least either one of the cornering judgment or the gradient judgment, and then set a time T (=T1+T2) which is a combined time of the first time T1 and the second time T2 as the delay time for delaying the upshift when the vehicle speed V and the throttle opening TH are in the range C. For such process, as the delay time T for permitting the upshift, a time including the driver's intention or running environments is used. Thus, regardless of the vehicle's running environments and aspects of the driver's operation, the upshift can be permitted constantly at a most suitable timing. Therefore, the shift control can be realized without giving the driver any uncomfortable feelings such as feelings of driving force shortage, excessive deceleration, etc.

Further, in the above-mentioned shift control device, the above-described first time T1 is shorter as the vehicle speed V variation is smaller, so is as the throttle opening TH variation is smaller, and so is as the vehicle speed V is higher. The above-described second time T2 is longer as the winding degree in the cornering judgment is higher, and so is as the road surface gradient in the gradient evaluation is higher. According to this, when it can be assumed that the driver has less intention of acceleration and deceleration and running environments are relatively stable with a low winding degree and gradient, an upshift timing can be advanced by setting the delay time for delaying the upshift short. On the other hand, when the vehicle is running on a winding or gradient road, by setting the delay time for delaying the upshift long, the upshift timing can be delayed to prevent to give the driver the sense of driving force shortage.

Although the embodiment of the present invention has been described above, the present invention is not limited to the above embodiment. Various modifications can be made in a scope of the technical idea described in the following claims, the specification described above and the accompanying drawings without departing from the spirit and scope of the present invention.

The invention claimed is:

1. A shift control device for automatic transmission for upshift and downshift controls of gear positions according to a shift map including an upshift line and a downshift line set per gear position, shift control device comprising:
   a speed control means configured to output upshift and downshift transmission signals according to a first upshift line and a downshift line based on first transmission properties set depending on a vehicle speed and a throttle opening;
   a downshift judgment means configured to judge, on the basis of the first transmission properties, the downshift transmission signals having been output;
   a transmission property change means configured to change the first transmission properties to second transmission properties including a second upshift line being the first upshift line shifted to a high vehicle speed side;
   an operational state detection means configured to detect an operational state of a vehicle; and
   an upshift permission means configured to permit an upshift according to fulfillment of predetermined conditions when a vehicle speed and a throttle opening is in a range between the first upshift line and the second upshift line,
   wherein the upshift permission means calculates an allowance driving force of the vehicle when upshifting at a current vehicle speed and throttle opening, then calculates a threshold value of driving force including a throttle opening variation, a vehicle speed variation, a cornering judgment of judging a winding degree of a road with a vehicle kept running thereon, and a gradient judgment of judging a gradient of a road surface with the vehicle kept running thereon, then compares the threshold value with the allowance driving force, and accordingly permits an upshift when the allowance driving force is larger than the threshold value.

2. The shift control device for automatic transmission according to claim 1, wherein the threshold value of driving force is set higher as the winding degree in the cornering judgment is higher and set higher as the gradient of the road surface in the gradient judgment is higher.

3. A shift control device for automatic transmission performing upshift and downshift controls of gear positions according to a shift map including an upshift line and a downshift line set per gear position, the shift control device comprising:
   a speed control means configured to output transmission signals of upshift and downshift according to the first upshift line and the downshift line based on first transmission properties set depending on a vehicle speed and a throttle opening;
   a downshift judgment means configured to judge, based on the first transmission properties, the downshift transmission signals having been output;
   a transmission property change means configured to change, when the downshift judgment means judges downshift, the first transmission properties to second transmission properties including a second upshift line being the first upshift line shifted to a high vehicle speed side;
   a operational state detection means configured to detect an operational state of a vehicle; and
   a delay means configured to delay, in a range where an upshift transmission signal is output based on the second transmission properties, to output the upshift transmission signal during a predetermined delay time based on a vehicle's operational state detected by the operational state detection means,
   wherein the delay means calculates a first time based on a vehicle speed variation, a throttle opening variation and a vehicle speed and a second time based on at least either one of a cornering judgment of a degree of a winding road with the vehicle kept running and a gradient judgment of a gradient of a road with the vehicle kept running, and then setting a combined time of the first time and the second time as a delay time for delaying an upshift.

4. The shift control device for automatic transmission according to claim 3, wherein the first time is shorter as the vehicle speed variation is smaller, shorter as the throttle opening variation is smaller and shorter as the vehicle speed is higher, and
   wherein the second time is longer as the winding degree of the road in the cornering judgment is higher and longer as the gradient of the road surface in the gradient judgment is higher.

* * * * *